No. 708,922. Patented Sept. 9, 1902.
D. F. SAUM.
BUILDING RENOVATING APPARATUS.
(Application filed Apr. 17, 1901. Renewed Jan. 29, 1902.)
(No Model.) 3 Sheets—Sheet 2.
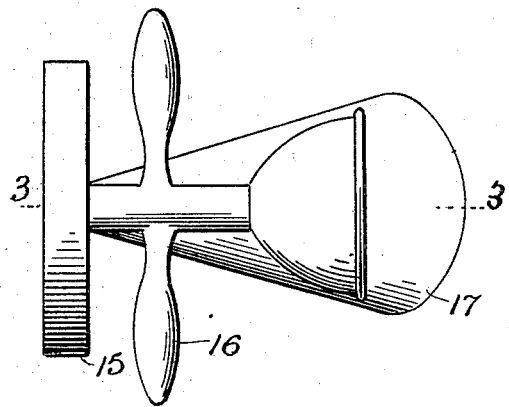
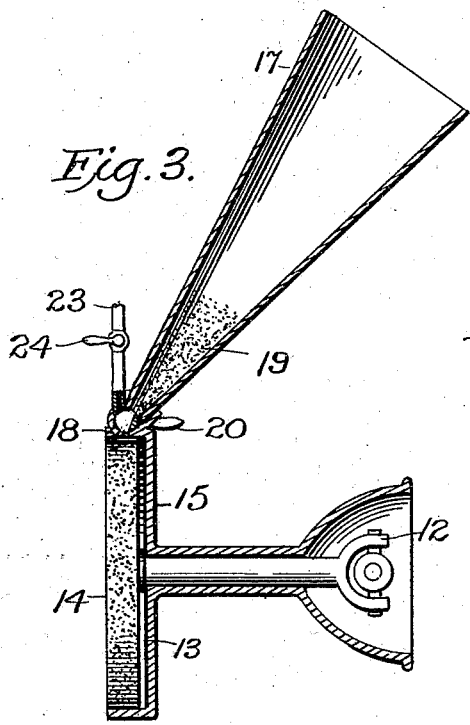
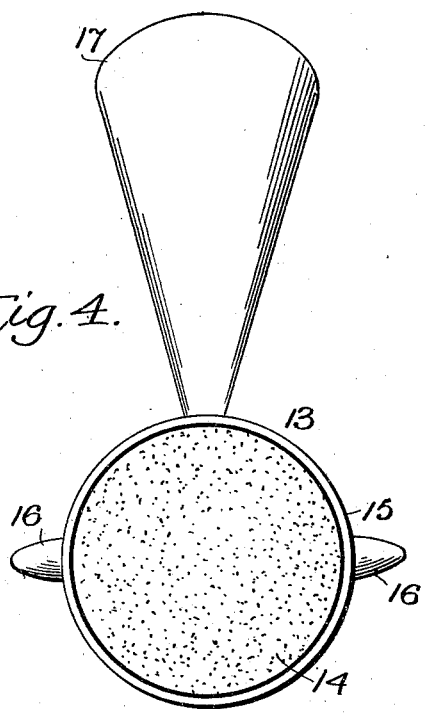

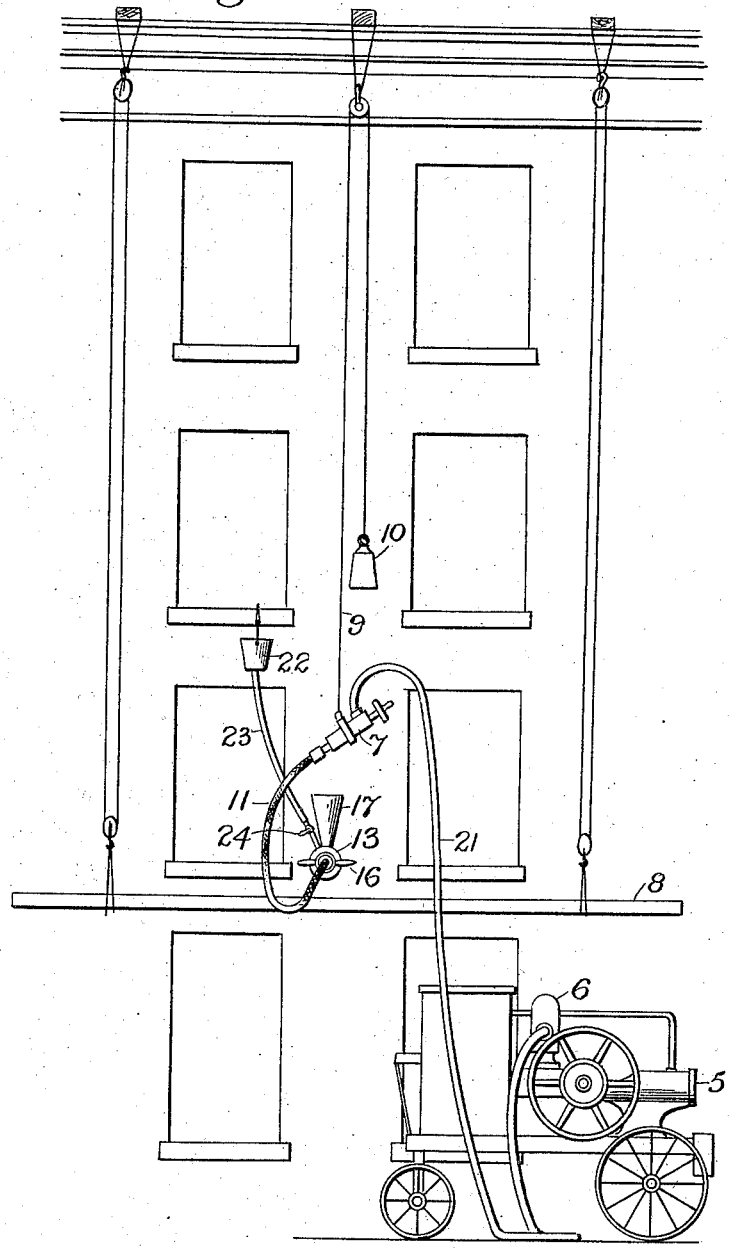

No. 708,922. Patented Sept. 9, 1902.
D. F. SAUM.
BUILDING RENOVATING APPARATUS.
(Application filed Apr. 17, 1901. Renewed Jan. 29, 1902.)
(No Model.)
3 Sheets—Sheet 3.
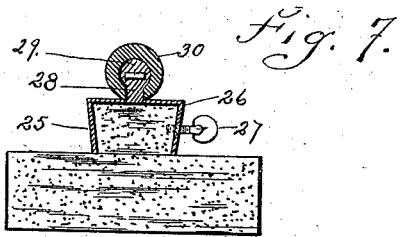
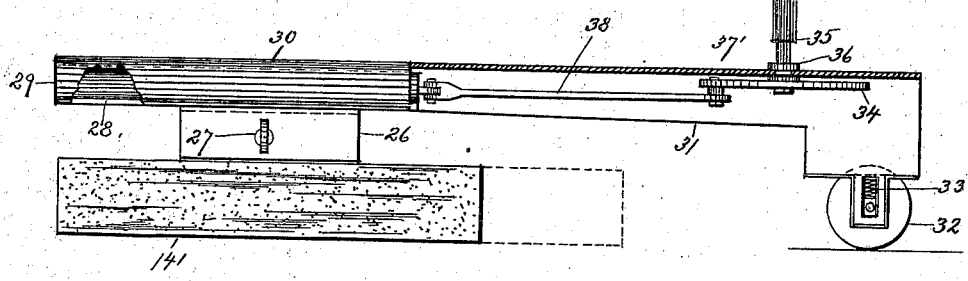
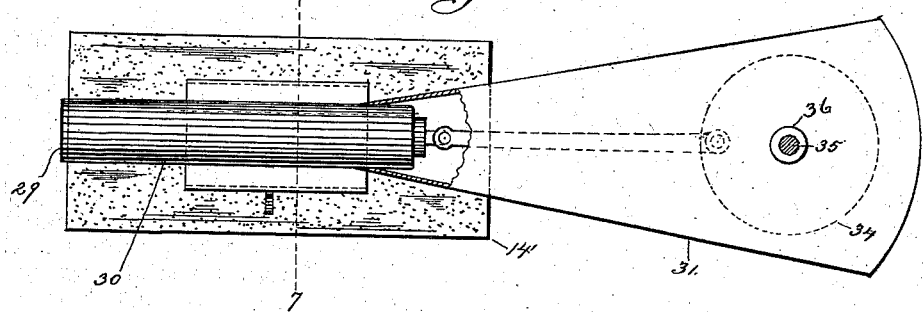
WITNESSES:
E. L. Livingstone
D. H. Priest
INVENTOR
David F. Saum
BY
Garry P. Van Wye
ATTORNEY

UNITED STATES PATENT OFFICE.

DAVID F. SAUM, OF NEW YORK, N. Y., ASSIGNOR TO NEW YORK STONE, BRICK & TERRA-COTTA RENOVATING COMPANY, OF NEW YORK.

BUILDING-RENOVATING APPARATUS.

SPECIFICATION forming part of Letters Patent No. 708,922, dated September 9, 1902.

Application filed April 17, 1901. Renewed January 29, 1902. Serial No. 91,775. (No model.)

*To all whom it may concern:*

Be it known that I, DAVID F. SAUM, a citizen of the United States, residing at New York, in the county and State of New York, have invented a new and useful Building-Renovating Apparatus, of which the following is a specification.

My invention relates to building-renovating apparatus, and has for its object to provide apparatus to clean the surface of the stone, brick, or other material forming the exterior or other parts of the building.

A further object of my invention is to provide a simple and cheap apparatus that can be easily transported from one building to another.

I attain these objects by the mechanism illustrated in the accompanying drawings, in which—

Figure 1 is a side view of a building and of my apparatus in position for renovating the surface of the exterior thereof. Fig. 2 is a bottom plan view of the casing inclosing one form of abrading-tool and auxiliary material. Fig. 3 is a vertical section thereof on the line 3 3 of Fig. 2. Fig. 4 is a face view of the abrading-tool shown in Fig. 2. Fig. 5 is a plan view of another form of abrading-tool and apparatus for working the same. Fig. 6 is a side elevation of the same, a part being in section; and Fig. 7 is a section on the line 7 7 of Fig. 5.

In the accompanying drawings similar numerals of reference refer to like parts in each of the views, and in the practice of my invention I provide a portable engine 5, adapted to operate an air-compressor 6, which is preferably mounted on the same truck as the engine. I also provide an air-motor 7, which is preferably suspended adjacent to the workman's platform 8 by a rope 9 and counterweight 10.

Connected with the air-motor 7 is a flexible shaft 11, the other end of which is connected with the shaft 12 of the abrading-tool 13. The abrading-tool 13 is composed of a disk 14, which, as shown in the drawings, is circular in form, although the shape of the tool may be varied in accordance with the surface to be cleaned and is composed, preferably, of abrading material, as stone, emery, carborundum, and the like. The disk 14 is inclosed by a casing 15, to which are connected handles 16, by means of which the tool may be held in position, as will be readily understood. I also prefer to use an abrading-powder with the abrading-tool, and with this end in view I have prepared a receptacle 17, which is detachably secured to the casing 15, and a passage-way 18 communicates with the receptacle 17 and with the interior of the casing adjacent to the face of the disk 14, so that the abrading-powder 19, which is composed of crushed steel or other suitable abrading material, is fed between the disk 14 and the surface to be renovated, while a cock 20 serves to shut off the flow of powder when the tool is not in use or when desired.

The operation will be readily understood. The platform 8 is adjusted to the required height for the operator and the motor 7 is adjusted to any desired position relative to the same, so that the operator can easily control the motor, which is connected with the air-compressor 6 by a flexible tube 21. Then by grasping the handle 16 the disk 14 can be held against the building, and the surface thereof will be quickly and efficiently cleaned, as will be readily understood. As previously stated, it is not necessary that the powder 19 should be used; but in most cases it will be found to greatly assist in renovating the surface, and when I use the powder it is not necessary that the disk 14 should be composed of abrading material, although it is desirable that it should, as it materially assists the powder in its work. I also find that it is usually preferable to use water with the abrading-powder 19, and with this end in view I provide a bucket or other receptacle 22, which may be suspended from any part of the building, and a flexible tube 23 leads from the same to the casing 15 and communicates with the interior of the said casing through the passage-way 18 or at any other convenient point, while a stop 24 serves to shut off the flow of water when desired.

In cleaning the uneven surfaces of the building and in cleaning the corners it is generally impossible to use a circular disk or an abrading-tool having a rotary motion, and for surfaces of this kind I provide a tool of a different shape and give the same a reciprocating motion, as illustrated in Figs. 5 to 7 of the drawings. As shown in these figures, I use a block of abrading material 14', which I have shown as rectangular in form, although the form may be varied in accordance with the surface to be cleaned, and the block 14' is provided on the top thereof with a reduced portion 25, on which is mounted a casing 26, which is secured thereon by a set-screw 27 or in any convenient manner. Secured to the casing 26 by a rib 28 is a shaft 29, adapted to slide in a sleeve 30, which is slotted on its under side to permit the rib 28 to pass therethrough, as clearly shown in Fig. 7, and connected with the sleeve 30 is a casing 31, which may be supported at its rear end by a roller 32, preferably controlled by a spring 33; and in the casing 31 I mount a crank-wheel 34, supported by the shaft 35 and collars 36 and 37, and the wheel 34 is eccentrically connected with the shaft 29 by a link 38, as clearly shown. By connecting the flexible shaft 11 with the shaft 35 the wheel 34 will be given a rotary and the block 14' a reciprocating motion, as will be readily understood.

It is evident that the air-motor 7 could be mounted on the workman's platform, although this is not so desirable, and many other changes in detail can be made.

Having thus described my invention, what I claim as new, and desire to secure by Letters Patent, is—

1. In a building-renovating apparatus, the combination with a source of power of a motor; means to adjustably suspend the same adjacent to the workman's platform; a flexible shaft connected with said motor, and an abrading-tool operated by said shaft.

2. A building-renovating apparatus, comprising a portable air-compressor, a motor adjustably suspended adjacent to the workman's platform, a flexible shaft connected with said motor, a disk operated by said shaft, and means to feed abrading-powder to the face of said disk, as and for the purpose set forth.

3. A building-renovating apparatus, comprising a portable air-compressor, a motor adjustably suspended adjacent to the workman's platform, a flexible shaft connected with said motor, a disk operated by said shaft, a casing inclosing said disk, and means to feed abrading-powder through said casing to the face of said disk, as and for the purpose set forth.

4. A building-renovating apparatus, comprising a source of power, a motor mounted within reach of the workman operating the abrading-tool, an abrading-tool, flexible connections between the source of power and said motor, and flexible connections between the motor and said tool, as and for the purpose set forth.

5. A building-renovating apparatus comprising a portable air-compressor, a motor adjustably suspended adjacent to the workman's platform, a flexible tube connecting said compressor and said motor, a flexible shaft connected with said motor, a disk operated by said shaft, a casing inclosing said disk, a powder-receptacle connected with said casing, and in communication with the interior thereof adjacent to the face of said disk, and means to convey a liquid to the face of said disk, as and for the purpose set forth.

6. A building-renovating apparatus comprising a portable engine and air-compressor, a motor adjustably mounted adjacent to the workman's platform, flexible connections between the compressor and said motor, a flexible shaft connected with said motor, a disk composed of abrading material operated by said shaft, a casing inclosing said disk, a powder-receptacle in communication with the interior of said casing adjacent to the face of said disk, a water-receptacle, and a flexible tube connecting said water-receptacle with the interior of said casing, as and for the purpose set forth.

In testimony whereof I have signed my name to this specification in the presence of two subscribing witnesses.

DAVID F. SAUM.

Witnesses:
E. L. LIVINGSTONE,
D. H. PRIEST.